Patented Aug. 23, 1932

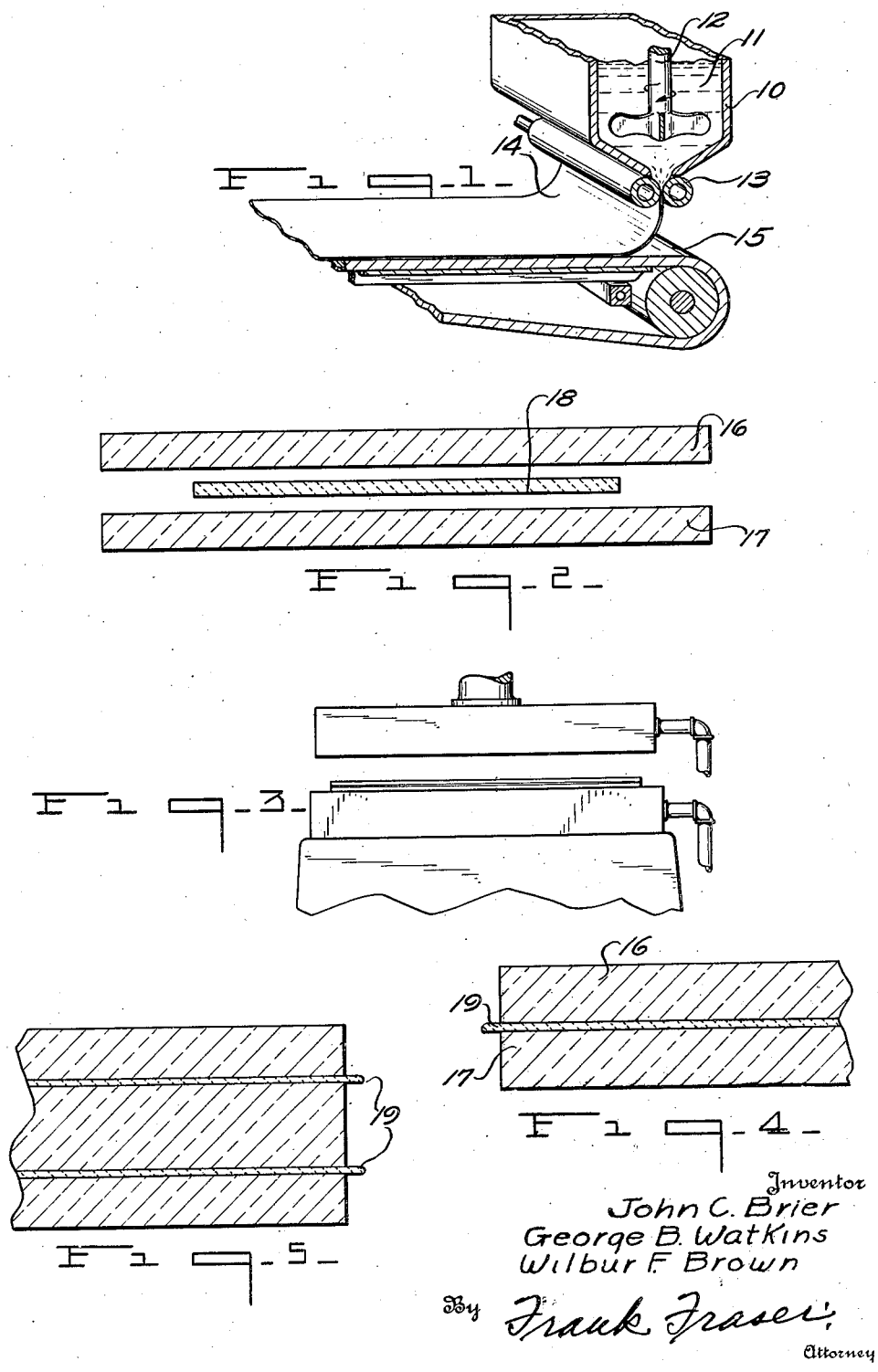

1,872,663

UNITED STATES PATENT OFFICE

JOHN C. BRIER AND GEORGE B. WATKINS, OF ANN ARBOR, MICHIGAN, AND WILBUR F. BROWN, OF TOLEDO, OHIO, ASSIGNORS TO LIBBEY-OWENS-FORD GLASS COMPANY, OF TOLEDO, OHIO, A CORPORATION OF OHIO

LAMINATED GLASS

Application filed July 18, 1927. Serial No. 206,416.

The present invention relates to an improved process for producing as an improved article of manufacture, a sheet of laminated glass.

An important object of the invention is to provide, in the manufacture of laminated glass, a process wherein uncured plastic material may be used satisfactorily.

Another object of the invention is to provide such a process wherein a plastic material may be used without being cured, the said plastic material including a high boiling point, low vapor pressure solvent.

A further object of the invention is to provide a laminated glass product comprising a plurality of sheets of glass and an intermediate layer of plastic material, the intermediate layer being of such a nature that it can be united to the remaining laminations without the necessity and expense of curing the same, the said plastic material including ingredients that will give a resultant mass having a low vapor pressure.

Still another object of the invention is to provide a plastic particularly well adapted for use in the manufacture of laminated glass, said plastic being a mixture of plasticizers and solvents of such a character that the resulting vapor pressure of the mixture is reduced, by mutual solution, to a relatively very low point.

Other objects and advantages of the invention will become more apparent during the course of the following description.

In the drawing wherein like numerals are employed to designate like parts throughout the same, Fig. 1 is a diagrammatic view illustrating the formation of a plastic material.

Fig. 2 is a diagrammatic sectional view illustrating the laminations before they have been united, Fig. 3 represents diagrammatically a press that may be used to accomplish the uniting of the laminations, Fig. 4 is a fragmentary sectional view showing the laminations after they have been united, and Fig. 5 is a modified form of product formed in accordance with the same process.

Heretofore, in the production of laminated glass, it has been customary to use a cellulose sheet material as the plastic part of the sandwich; and while thus far no process has been developed which does not at times experience "let-goes", it has been found in practice that the chances of having let-goes are greatly reduced by using seasoned or cured cellulose material. The necessity for this curing appears to be as follows:

In the batch composing ordinary sheet celluloid or other cellulose materials there are used, during the process of kneading, solvents such as alcohols, ethers, etc. which have relatively high vapor pressures and low boiling points; these liquids act as "free solvents"; the object of the curing process is to remove the free solvents, but in common practice of commercial curing more or less of the free solvents remain. At ordinary atmospheric temperatures, the amount of free solvent does not seem to cause let-goes, but when the temperature is raised, for example in automobile glass exposed to the summer sun, these free solvents tend to find an outlet, and their increased vapor pressure pushes the adjacent laminations away and causes a separation in the sandwich.

It is an important feature of the present process that the plastic material used is of such a nature that it does not have to be cured before it can be satisfactorily used.

Referring to Fig. 1, the numeral 10 designates a container in which a plastic mass of material 11 can be made. Illustrated diagrammatically, and designated by the numeral 12, is an agitating or stirring member which may be used to make the mass 11 thoroughly homogeneous. After the mass has been suitably mixed, and heat treated if desired, it is permitted to pass from said receptacle between kneading and sizing rolls 13 which form a sheet or a gob 14 from said material. The sheet 14 may be conveyed on a suitable means 15 as will be readily understood.

In Fig. 2, two sheets of glass 16 and 17, respectively, are shown, and a sheet 18 of plastic material, as produced with the machine shown in Fig. 1, is interposed there-between. In Fig. 2, the sheet 18 is shown of substantially greater thickness than the resultant film 19 shown in Fig. 4. Although it is not necessary, the process may be practiced by heating such a relatively thick intermediate member and pressing the sheets of glass to reduce the intermediate sheet or gob to a predetermined uniform thickness. In some instances it may be desirable to make the gob sufficiently large that it will extend past the edges of the sheet as shown. In such cases the excess is trimmed off by a sharp implement or the like.

Due to the mixture of the plastic material, the sheet 14 may be used immediately after it has been formed without the necessity of seasoning or curing. As an example of batches that may be used, the following is given:

(1) Cellulose acetate
    Triacetin
(2) Cellulose acetate
    Camphor
    Phthallic anhydride
    Triacetin In the first mixture, the triacetin is a high boiling point, low vapor pressure solvent or plasticizer, and due to its nature the plastic material formed by the mixture of cellulose acetate and triacetin can be used without curing.

One object of this invention is to use a mixture of plasticizers and solvents of such a character that the resulting vapor pressure of the mixture is reduced, by mutual solution, to a relatively very low point. Or, in other words, as is well known in physical chemistry, the addition of a solvent having a low vapor pressure to a solvent having a high vapor pressure where the two materials are mutually soluble, causes a decrease in the vapor pressure of the material having the high vapor pressure. In the example cited above, the addition of triacetin decreases the total vapor pressure of the mixture caused by the presence of camphor which has a relatively high vapor pressure. Therefore, Example (2) cited above will, at temperatures to which laminated glass is ordinarily subjected, have a vapor pressure low enough so that let-goes will not develop.

By using a high boiling point, low vapor pressure solvent in the batch, the finished product will be suitable for use in the manufacture of laminated glass because the temperatures to which the finished sheet are subjected will not cause any reaction. Another important part of the invention is that, although a high vapor pressure material is used, additional ingredients are used to cut down the vapor pressure point.

Of course, the material does not have to be used in the form of a gob, as it can readily be formed into sheets of the required thickness. Also, the plastic can either be united directly to the surface of the glass sheets or intermediate skins can be used. In such cases suitable skins are formed on the glass sheets, and the improved plastic united to the skins. Of course, the skins can be formed from plastic having the same general characteristics of the batches above given.

Any desired solvent, cements, etc. can be used to assist in obtaining a bond between the laminations, although their use is not imperative.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. As a new article of manufacture, a sheet of laminated glass including a lamination of uncured plastic material having a low vapor pressure.

2. As a new article of manufacture, a sheet of laminated glass including a lamination of uncured cellulose material having a low vapor pressure.

3. As a new article of manufacture, a sheet of laminated glass including a lamination of uncured cellulose plastic composition having a high boiling point and a low vapor pressure.

Signed at Toledo, in the county of Lucas and State of Ohio, this 14th day of July, 1927.

JOHN C. BRIER.
GEORGE B. WATKINS.
WILBUR F. BROWN.